(12) United States Patent
Dingman et al.

(10) Patent No.: US 11,702,567 B2
(45) Date of Patent: Jul. 18, 2023

(54) MOISTURE CURABLE ORGANOPOLYSILOXANE COMPOSITION AND ELECTRIC/ELECTRONIC APPARATUS

(71) Applicant: DOW SILICONES CORPORATION, Midland, MI (US)

(72) Inventors: David R. Dingman, Midland, MI (US); John B. Horstman, Midland, MI (US); Steven Swier, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 445 days.

(21) Appl. No.: 16/972,164

(22) PCT Filed: Jun. 5, 2019

(86) PCT No.: PCT/US2019/035488
§ 371 (c)(1),
(2) Date: Dec. 4, 2020

(87) PCT Pub. No.: WO2019/236648
PCT Pub. Date: Dec. 12, 2019

(65) Prior Publication Data
US 2021/0238444 A1    Aug. 5, 2021

Related U.S. Application Data

(60) Provisional application No. 62/681,324, filed on Jun. 6, 2018.

(51) Int. Cl.
| | | |
|---|---|---|
| *C08G 77/18* | (2006.01) | |
| *C09D 183/04* | (2006.01) | |
| *C08L 83/04* | (2006.01) | |
| *C08L 83/00* | (2006.01) | |
| *C08G 77/50* | (2006.01) | |

(52) U.S. Cl.
CPC ............ *C09D 183/04* (2013.01); *C08L 83/00* (2013.01); *C08L 83/04* (2013.01); *C08G 77/18* (2013.01); *C08G 77/50* (2013.01)

(58) Field of Classification Search
CPC ....... C08G 77/18; C08G 77/16; C07F 7/1804; C09D 143/04
See application file for complete search history.

(56) References Cited

U.S. PATENT DOCUMENTS

| | | |
|---|---|---|
| 7,754,829 B2 | 7/2010 | Kimura |
| 8,921,495 B2 | 12/2014 | Horstman et al. |
| 2002/0156187 A1 | 10/2002 | Greene |
| 2010/0113730 A1 | 5/2010 | Morita |
| 2015/0140346 A1 | 5/2015 | Iida et al. |
| 2015/0252220 A1 | 9/2015 | Okawa et al. |
| 2015/0376482 A1 | 12/2015 | Bekemeier et al. |
| 2016/0060494 A1 | 3/2016 | Patel et al. |
| 2017/0037287 A1* | 2/2017 | Kodama ................. C08L 83/00 |

FOREIGN PATENT DOCUMENTS

| | | |
|---|---|---|
| CN | 1279250 A | 1/2001 |
| TW | 201434882 A | 9/2014 |
| WO | 2015098118 A1 | 7/2015 |

OTHER PUBLICATIONS

International Search Report for PCT/US2019/035488 dated Sep. 24, 2019, 5 pages.

* cited by examiner

*Primary Examiner* — Kuo Liang Peng
(74) *Attorney, Agent, or Firm* — Warner Norcross + Judd LLP

(57) ABSTRACT

A moisture curable polyorganosiloxane composition is disclosed. The composition comprises: (A) a polyorganosiloxane endblocked with alkoxysilyl-containing groups at both molecular terminals; (B) a polyorganosiloxane resin having a content of OZ in a range of from about 50 mol % to about 150 mol %, wherein each Z is H or an alkyl group such that OZ represents a silanol group and/or a silicon atom-bonded alkoxy group; and (C) a polyorganosiloxane resin having an alkoxysilyl-containing group. The composition exhibits good to excellent coating performance without using a solvent. In addition, the composition can cure by contacting moisture in air to form a cured product exhibiting good to excellent mechanical properties.

15 Claims, No Drawings

MOISTURE CURABLE ORGANOPOLYSILOXANE COMPOSITION AND ELECTRIC/ELECTRONIC APPARATUS

CROSS-REFERENCE TO RELATED APPLICATIONS

This application is the National Stage of International Appl. No. PCT/US2019/035488 filed on 5 Jun. 2019, which claims priority to and all advantages of U.S. Provisional Patent Application No. 62/681,324 filed on 6 Jun. 2018, the content of which is incorporated herein by reference.

TECHNICAL FIELD

The present invention relates to a moisture curable organopolysiloxane composition that can cure by contact with moisture in air, and an electric/electronic apparatus obtained by using the composition.

BACKGROUND ART

Moisture curable polyorganosiloxane compositions that form cured products by contacting moisture in air are used as sealants, adhesives, or coatings of an electric/electronic apparatus because they do not require heating to cure. Patent Document 1 proposes a moisture curable polyorganosiloxane composition comprising: a polyorganosiloxane resin comprising: $R_3SiO_{1/2}$ siloxane units and $SiO_{4/2}$ siloxane units in a molar ratio of 0.6 to 1.2 wherein R is a monovalent $C_{1-6}$ hydrocarbon group, and having a hydroxysilyl content of less than 0.04 mole/100 g, a polyorganosiloxane having a hydrolysable silyl group incorporated in the molecular chain via an alkylene linkage, and a cure catalyst. Patent Document 2 proposes a moisture curable polyorganosiloxane composition comprising: a reactive resin, a reactive polymer, a moisture cure catalyst, and a crosslinker resin, wherein the reactive resin comprises the reaction product of a reaction of an alkenyl-functional siloxane resin comprising $R_3SiO_{1/2}$ siloxane units and $SiO_{4/2}$ siloxane units wherein R is as described above, and an alkoxysilane-functional organosiloxane compound having at least one silicon atom-bonded hydrogen atom in the presence of hydrosilylation catalyst, and the reactive polymer comprises the reaction product of a reaction of alkoxysilane-functional organosiloxane compound having at least one silicon atom-bonded hydrogen atom and a polyorganosiloxane having an average, per molecule, of at least two aliphatically unsaturated organic groups in the presence of a hydrosilylation catalyst. Patent Document 3 proposes a moisture curable polyorganosiloxane composition comprising: a polyorganosiloxane consisting of a both ends alkoxysilyl group-terminated polyorganosiloxane and a partial hydrolysis condensate an alkoxysilane compound, an alkoxysilane compound or a partial hydrolysis condensate thereof, and an organic titanium compound. Furthermore, Patent Document 4 proposes a moisture curable polyorganosiloxane composition comprising: a polyorganosiloxane having in a molecule at least two alkoxysilyl-containing groups on silicon atoms in the molecular chain, a diorganodialkoxysilane or partially hydrolyzed condensate thereof, and a condensation-reaction catalyst.

However, although the moisture curable polyorganosiloxane compositions described in Patent Documents 1 to 4 form cured products with good adhesion to a substrate, they have the problem that the cured products have poor mechanical properties such as breaking stress and elongation.

PRIOR ART DOCUMENTS

Patent Documents

Patent Document 1: U.S. Pat. No. 7,754,829 B2
Patent Document 2: United States Patent Application Publication No. 2015/0376482 A1
Patent Document 3: United States Patent Application Publication No. 2015/0140346 A1
Patent Document 4: International Publication No. WO2015/098118 A1

BRIEF SUMMARY OF THE INVENTION

Technical Problem

An object of the present invention is to provide a moisture curable polyorganosiloxane composition which exhibits good to excellent coating performance, and by contacting moisture in air, can cure to form a cured product exhibiting good to excellent mechanical properties. Another object of the present invention is to provide an electric/electronic apparatus which exhibits good to excellent reliability.

Solution to Problem

In various embodiments, the moisture curable polyorganosiloxane composition of this disclosure comprises:
(A) about 17 to about 40 mass %, based on the combined mass of components (A) to (C), of a polyorganosiloxane represented by the following general formula:

$$X\text{—}(SiR^{11}{}_2O)_m\text{—}SiR^{11}{}_2\text{—}X$$

wherein each $R^{11}$ is the same or different monovalent hydrocarbon group lacking an aliphatic unsaturated bond, each X is an alkoxysilyl-containing group, and "m" is an integer of from 20 to 1000;
(B) about 5 to about 30 mass %, based on the combined mass of components (A) to (C), of a polyorganosiloxane resin having a content of OZ in a range of from about 50 mol % to about 150 mol %, wherein each Z is H or an alkyl group such that OZ represents a silanol group and/or a silicon atom-bonded alkoxy group, and represented by the following average unit formula:

$$(R^{21}{}_3SiO_{1/2})_c(R^{21}{}_2SiO_{2/2})_d(R^{21}SiO_{3/2})_e(SiO_{4/2})_f$$

wherein each $R^{21}$ is the same or different monovalent hydrocarbon group, and "c", "d", "e" and "f" are numbers satisfied by the following conditions: $0 \leq c < 0.2$, $0 \leq d \leq 0.5$, $0.4 < e \leq 1.0$, $0 \leq f < 0.2$, and $c+d+e+f=1$; and
(C) about 40 to about 70 mass %, based on the combined mass of components (A) to (C), of a polyorganosiloxane resin represented by the following average unit formula:

$$(R^{31}{}_3SiO_{1/2})_g(SiO_{4/2})_1$$

wherein each $R^{31}$ is the same or different, and selected from a monovalent hydrocarbon group or X as described above, provided however, at least one $R^{31}$ is X per molecule, and "g" is a number of about 0.5 to about 1.5.

In various embodiments, X in component (A) is an alkoxysilyl-containing group selected from the group consisting of:

a group represented by the following general formula;

$$-R^{13}-SiR^{11}{}_a(OR^{12})_{(3-a)},$$

a group represented by the following general formula;

$$-R^{13}-(SiR^{11}{}_2O)_n-SiR^{11}{}_2-R^{13}-SiR^{11}{}_a(OR^{12})_{(3-a)},$$

and a group represented by the following general formula;

$$-R^{13}-(SiR^{11}{}_2O)_n-SiR^{11}{}_b-[OSiR^{11}{}_2-R^{13}-SiR^{11}{}_a(OR^{12})_{(3-a)}]_{(3-b)},$$

wherein each $R^{11}$ is as described above, each $R^{12}$ is an alkyl group, each $R^{13}$ is the same or different alkylene group, "a" is 0, 1 or 2, and "b" is 0 or 1.

In various embodiments, X in component (A) is a group represented by the following formula:

$$-C_2H_4-Si(CH_3)_2O-Si(CH_3)_2-C_2H_4-Si(OCH_3)_3$$

In various embodiments, component (B) is a polyorganosiloxane resin represented by the following average unit formula:

$$(R^{21}{}_2SiO_{2/2})_d(R^{21}SiO_{3/2})_e$$

wherein each $R^{21}$ is as described above, and "d" and "e" are numbers satisfied by the following conditions: $0<d\leq 0.5$, $0.5\leq e<1.0$, and $d+e=1$.

In various embodiments, X in component (C) is an alkoxysilyl-containing group selected from the group consisting of:

a group represented by the following general formula;

$$-R^{13}-SiR^{11}{}_a(OR^{12})_{(3-a)},$$

a group represented by the following general formula;

$$-R^{13}-(SiR^{11}{}_2O)_n-SiR^{11}{}_2-R^{13}-SiR^{11}{}_a(OR^{12})_{(3-a)},$$

and a group represented by the following general formula;

$$-R^{13}-(SiR^{11}{}_2O)_n-SiR^{11}{}_b-[OSiR^{11}{}_2-R^{13}-SiR^{11}{}_a(OR^{12})_{(3-a)}]_{(3-b)},$$

wherein each $R^{11}$ is as described above, each $R^{12}$ is an alkyl group, each $R^{13}$ is the same or different alkylene group, "a" is 0, 1 or 2, and "b" is 0 or 1.

In various embodiments, X in component (C) is a group represented by the following formula:

$$-C_2H_4-Si(CH_3)_2O-Si(CH_3)_2-C_2H_4-Si(OCH_3)_3$$

In various embodiments, the moisture curable polyorganosiloxane composition further comprises: (D) a condensation-reaction catalyst, in an amount of about 0.1 to about 20 parts by mass per 100 parts by mass of the total amount of components (A) to (C).

In various embodiments, the moisture curable polyorganosiloxane composition further comprises: (E) an arbitrary amount of a solvent.

In various embodiments, the moisture curable polyorganosiloxane composition further comprises: (F) an alkoxysilane represented by the general formula:

$$R^{41}{}_xSi(OR^{42})_{(4-x)}$$

wherein $R^{41}$ is a monovalent hydrocarbon group, $R^{42}$ is an alkyl group, and "x" is an integer of from 0 to 2, in an amount of about 0.1 to about 20 parts by mass per 100 parts by mass of the total amount of components (A) to (C).

The moisture curable polyorganosiloxane composition of this disclosure can be used for various applications. In certain embodiments, the moisture curable polyorganosiloxane composition is used as a conformal coating agent, e.g. as a conformal coating agent for an electric/electronic apparatus. Thus, in various embodiments, the electric/electronic apparatus of this disclosure can be obtained by using the moisture curable polyorganosiloxane composition.

Effects of the Invention

The moisture curable polyorganosiloxane composition according to this disclosure generally exhibits good to excellent coating performance. In addition, by contacting moisture in air, the moisture curable polyorganosiloxane composition can cure to form a cured product exhibiting good to excellent mechanical properties, such as a breaking stress and/or elongation.

Additionally, the electric/electronic apparatus according to this disclosure generally has good to excellent reliability due to high hardness and/or good to excellent thermal shock stability properties of the cured product of the moisture curable polyorganosiloxane composition.

DETAILED DESCRIPTION OF THE INVENTION

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of +0-25, 0-10, 0-5, or +0-2.5, % of the numerical values. Further, the term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

<Moisture Curable Polyorganosiloxane Composition>

In various embodiments, the moisture curable polyorganosiloxane composition according to this disclosure (hereinafter, the "composition") comprises the above components (A) to (C). In further embodiments, the composition further comprises one or more optional additives. For example, the composition may include one or more of components (D), (E), and (F), and/or other additives understood in the art, as described further below. Without being bound or limited by any particular theory, it is thought that the composition exhibits good to excellent storage stability. In addition, by contacting moisture in air, the composition can form a cured product exhibiting good to excellent mechanical properties, such as a breaking stress and/or elongation.

In various embodiments, component (A) comprises, or is, a polyorganosiloxane represented by the following general formula:

$$X—(SiR^{11}_2O)_m—SiR^{11}_2—X.$$

In the formula, each $R^{11}$ is the same or different monovalent hydrocarbon group lacking an aliphatic unsaturated bond. Examples of such groups include, but are not limited to: alkyl groups such as a methyl group, an ethyl group, a propyl group, a butyl group, a pentyl group, a hexyl group, a heptyl group, an octyl group, a nonyl group, a decyl group, and an octadecyl group; cycloalkyl groups such as a cyclopentyl group and cyclohexyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. In certain embodiments, each $R^{11}$ is an alkyl group, a cycloalkyl group, or an aryl group. In further embodiments, each $R^{11}$ is a methyl group or phenyl group.

In the formula, "m" means a degree of polymerization ("DP"). In various embodiments, "m" is an integer from 20 to 1000, optionally an integer from 20 to 500, optionally an integer from 50 to 500, optionally an integer from 50 to 300, or optionally an integer from 50 to 200. It is thought that when "m" is greater than or equal to the lower limit of the range described above, elastic property of the cured product is improved, and when "m" is less than or equal to the upper limit of the range described above, miscibility, handling and processability of the resulting composition are improved.

In the formula, each X is an alkoxysilyl-containing group. In various embodiments, X is selected from the group consisting of:
a group represented by the following general formula;

$$—R^{13}—SiR^{11}_a(OR^{12})_{(3-a)},$$

a group represented by the following general formula;

$$—R^{13}—(SiR^{11}_2O)_n—SiR^{11}_2—R^{13}—SiR^{11}_a(OR^{12})_{(3-a)},$$

and a group represented by the following general formula;

$$—R^{13}—(SiR^{11}_2O)_n—SiR^{11}_b—[OSiR^{11}_2—R^{13}—SiR^{11}_a(OR^{12})_{(3-a)}]_{(3-b)}.$$

In the formulae, each $R^{11}$ is as described above. In the formulae, each $R^{12}$ is an alkyl group. Examples of such groups include, but are not limited to, a methyl group, an ethyl group, a propyl group, a butyl group, a pentyl group, a hexyl group, a heptyl group, an octyl group, a nonyl group, a decyl group, and an octadecyl group. In certain embodiments, each $R^{12}$ is a methyl group or an ethyl group.

In the formulae, each $R^{13}$ is the same or different alkylene group. Examples of such groups include, but are not limited to, a methylmethylene group, an ethylene group, a methylethylene group, a propylene group, a butylene group, a pentylene group, a hexylene group, a heptylene group, and an octylene group. In certain embodiments, each $R^{13}$ is a methylmethylene group, an ethylene group, a methylethylene group, or a propylene group.

In the formulae, "a" is 0, 1, or 2, or optionally is 0 or 1. In the formulae, "b" is 0 or 1, or optionally is 0. In the formulae, "n" is an integer of from 1 to 20, optionally an integer of from 1 to 10, or optionally an integer of from 1 to 5.

Examples of suitable alkoxysilyl-containing groups include groups represented by the following formulae:

—$C_2H_4$—Si(OCH$_3$)$_3$

—$C_2H_4$—SiCH$_3$(OCH$_3$)$_2$

—$C_3H_6$—Si(OCH$_3$)$_3$

—$C_2H_4$—Si(OC$_2$H$_5$)$_3$

—$C_2H_4$—Si(CH$_3$)$_2$O—Si(CH$_3$)$_2$—$C_2H_4$—Si(OCH$_3$)$_3$

—$C_3H_6$—Si(CH$_3$)$_2$O—Si(CH$_3$)$_2$—$C_2H_4$—Si(OCH$_3$)$_3$

—$C_2H_4$—Si(CH$_3$)$_2$O—Si(CH$_3$)$_2$—$C_2H_4$—SiCH$_3$(OCH$_3$)$_2$

—$C_2H_4$—Si(CH$_3$)$_2$O—Si(CH$_3$)$_2$—$C_3H_6$—Si(OCH$_3$)$_3$

—$C_3H_6$—Si(CH$_3$)$_2$O—Si(CH$_3$)$_2$—$C_3H_6$—Si(OCH$_3$)$_3$

—$C_2H_4$—Si(CH$_3$)$_2$O—Si(CH$_3$)$_2$—$C_6H_{12}$—Si(OCH$_3$)$_3$

—$C_2H_4$—[Si(CH$_3$)$_2$O]$_2$—Si(CH$_3$)$_2$—$C_2H_4$—Si(OCH$_3$)$_3$

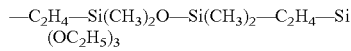

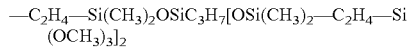

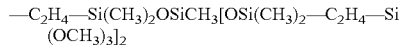

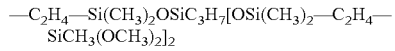

The viscosity at 23±2° C. of component (A) is not limited. In various embodiments, the viscosity of component (A) at 23±2° C. is in a range of from about 100 to about 10,000 mPa-s, or optionally in a range of from about 100 to about 1,000 mPa-s. It is thought that when the viscosity of component (A) is greater than or equal to the minimum value of the range given above, elastic property of the cured product is improved, and when it is less than or equal to the maximum value of the range given above, miscibility, handling and processability of the resulting composition are improved.

In various embodiments, the content of component (A) is in a range of from about 17 to about 40 mass %, optionally in a range of from about 18 to about 40 mass %, optionally in a range of from about 20 to about 40 mass %, optionally in a range of from about 20 to about 35 mass %, or optionally in a range of from about 20 to about 32 mass %, based on the combined mass of components (A) to (C). It is thought that when the content of component (A) is greater than or equal to the lower limit of the range described above, flexibility or thermal shock stability of the resulting cured product is improved, and when the content is less than or equal to the upper limit of the range described above, hardness is improved with good thermal shock stability.

In various embodiments, component (B) comprises, or is, a polyorganosiloxane resin represented by the following average unit formula:

$$(R^{21}_3SiO_{1/2})_c(R^{21}_2SiO_{2/2})_d(R^{21}SiO_{3/2})_e(SiO_{4/2})_f$$

In the formula, each $R^{21}$ is the same or different monovalent hydrocarbon group. Examples of such groups include, but are not limited to: alkyl groups such as a methyl group, an ethyl group, a propyl group, a butyl group, a pentyl group, a hexyl group, a heptyl group, an octyl group, a nonyl group, a decyl group, and an octadecyl group; cycloalkyl groups such as a cyclopentyl group and cyclohexyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. In certain embodiments, each $R^{21}$ is an alkyl group, a cycloalkyl group, or an aryl group. In further embodiments, each $R^{21}$ is a methyl group or phenyl group.

In the formula, "c", "d", "e" and "f" are numbers satisfied by the following conditions: 0≤c<0.2, 0≤d≤0.5, 0.4<e≤1.0, 0≤f<0.2, and c+d+e+f=1; optionally c=0, 0<d≤0.5, 0.5≤e<1.0, f=0, and c+d+e+f=1, optionally c=0, 0≤d≤0.1, 0.9≤e≤1, f=0, optionally c=0, 0<d≤0.1, 0.9≤e≤1, f=0, or optionally c=0, 0.01≤d≤0.1, 0.9≤ s 0.99, f=0, and c+d+e+f=1. It is thought that when "d" is greater than or equal to the lower limit of the range described above, the composition forms a cured product exhibiting good flexibility, and when "e" is less than or equal to the upper limit of the range described above, the composition forms a cure product exhibiting good mechanical strength.

In certain embodiments, component (B) comprises an organopolysiloxane resin represented by the following average unit formula:

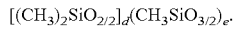

In the formula, "d" and "e" are numbers as described above.

In various embodiments, component (B) has a content of OZ in a range of from about 50 mol % to about 150 mol %, optionally in a range of from about 60 mol % to about 150 mol %, optionally in a range of from about 70 mol % to about 150 mol %, optionally in a range of from about 50 mol % to about 140 mol %, optionally in a range of from about 50 mol % to about 130 mol %, optionally in a range of from about 60 mol % to about 130 mol %, optionally in a range of from about 70 mol % to about 130 mol %, or optionally in a range of from about 70 mol % to about 120 mol %. It is thought that when the content of OZ is in the range(s) given above, compatibility of component (B) in component (A) is improved. Wherein each Z is H or an alkyl group such that OZ represents a silanol group and/or a silicon atom-bonded alkoxyl group. In certain embodiments, each Z is H or a methyl group such that OZ represents a silanol group and/or a silicon atom-bonded methoxy group. In various embodiments, the OZ content comprises silanol groups, silicon atom-bonded alkoxyl group, or a combination of silanol groups and silicon atom-bonded alkoxyl groups.

An example of a test method for determining OZ content is as follows. In the test method for obtaining the mol % of OZ, it is analyzed by $^{29}$Si and 13C NMR in deuterated benzene. Total OZ content is determined from $^{29}$Si NMR analysis and is reported as a molar fraction based on Si units. In certain embodiments, the amount of this OZ content that was methoxy is determined from 13C NMR analysis (1,4-dioxane is used as an internal standard). The difference between the total OZ content and the amount of methoxy was the amount of silanol groups present.

Component (B) generally has a molecular weight distribution and is a mixture of a plurality of polyorganosiloxane resins. In addition, component (B) may be obtained by blending individually prepared polyorganosiloxane resins. In such cases, each polyorganosiloxane resin need not correspond to the average unit formula specified above, and the mixture thereof may satisfy the above-mentioned average unit formula.

In various embodiments, the content of component (B) is in a range of from about 5 to about 30 mass %, optionally in a range of from about 5 to about 25 mass %, or optionally in a range of from about 8 to about 25 mass %, based on the combined mass of components (A) to (C). It is thought that when the content of component (B) is greater than or equal to the lower limit of the range described above, thermal shock stability of the resulting cured product is improved, and when the content is less than or equal to the upper limit of the range described above, hardness is improved with good thermal shock stability.

In certain embodiments, component (C) comprises, or is, a polyorganosiloxane resin represented by the following average unit formula:

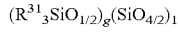

In the formula, each $R^{31}$ is the same or different, and selected from a monovalent hydrocarbon group or X. Examples of such monovalent hydrocarbon groups for $R^{31}$ include, but are not limited to: alkyl groups such as a methyl group, an ethyl group, a propyl group, a butyl group, a pentyl group, a hexyl group, a heptyl group, an octyl group, a nonyl group, a decyl group, and an octadecyl group; cycloalkyl groups such as a cyclopentyl group and cyclohexyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. X is an alkoxysilyl-containing group as described above. In certain embodiments, at least one $R^{31}$ per molecule is X. Examples of suitable alkoxysilyl-containing groups include groups represented by the above formulae.

In the formula, "g" is a number of about 0.5 to about 1.5, optionally a number of about 0.6 to about 1.5, optionally a number of about 0.7 to about 1.5, optionally a number of about 0.5 to about 1.4, optionally a number of about 0.5 to about 1.3, optionally a number of about 0.7 to about 1.4, or optionally a number of about 0.6 to about 1.3. It is thought that when "g" is greater than or equal to the lower limit of the range described above, the composition forms a cured product exhibiting good flexibility, and when "g" is less than or equal to the upper limit of the range described above, the composition forms a cure product exhibiting good mechanical strength.

In various embodiments, the content of component (C) is in a range of from about 40 to about 70 mass %, optionally in a range of from about 45 to about 70 mass %, optionally in a range of from about 40 to about 65 mass %, optionally in a range of from about 45 to about 65 mass %, or optionally in a range of from about 50 to about 60 mass %, based on the combined mass of components (A) to (C). It is thought that when the content of component (C) is greater than or equal to the lower limit of the range described above, mechanical strength or hardness of the resulting cured product is improved, and when the content is less than or equal to the upper limit of the range described above, flexibility of the resulting cured product is improved with good thermal shock stability.

As introduced above, the composition according to this disclosure may further comprise components in addition to and other than components (A) to (C). For example, the composition may further comprise at least one of a condensation-reaction catalyst (D), a solvent (E), an alkoxysilane (F), a fluorescent whitening agent, a corrosion inhibitor, a chelating agent, an adhesion promoter, or the like.

Component (D) is a condensation-reaction catalyst. Examples of component (D) include, but are not limited to: tin compounds such as dimethyltin dineodecanoate, stannous octoate, and the like; and titanium compounds such as tetra(isopropoxy)titanium, tetra(n-butoxy)titanium, tetra(t-butoxy)titanium, di(isopropoxy)bis(ethylacetoacetate)titanium, di(isopropoxy)bis(methylacetoacetate)titanium, di(isopropoxy)bis(acetylacetonate)titanium, and the like.

The content of component (D) is not limited provided that it is an amount that can impart sufficient curability of the resulting composition. In various embodiments, the content of component (D) is in a range of from about 0.01 to about 20 parts by mass, optionally in a range of from about 0.01 to about 15 parts by mass, optionally in a range of from about 0.01 to about 10 parts by mass, optionally in a range of from about 0.01 to about 5 parts by mass, optionally in a range of from about 0.05 to about 10 parts by mass, or optionally in a range of from about 0.05 to about 5 parts by mass, relative to 100 parts by mass of the total amount of components (A) to (C). It is thought that when the content of component (D) is greater than or equal to the lower limit of the range described above, the resulting composition cures sufficiently by moisture in air, and when the content is less than or equal to the upper limit of the range described above, surface cure rate of the resulting composition is improved.

Component (E) is a solvent. Examples of component (E) include, but are not limited to: aliphatic hydrocarbon-type solvents such as heptane, octane, nonane, decane, and undecane; and siloxane-type solvents such as straight dimethylsiloxane oligomers, cyclic dimethylsiloxane oligomers, and tetrakis (trimethylsiloxy) silane.

The content of component (E) is not limited provided that it is an amount that coating performance of the resulting composition is improved. In various embodiments, the content of component (E) is in a range of from about 0.1 to about 50 parts by mass, optionally in a range of from about 0.1 to about 30 parts by mass, optionally in a range of from about 0.1 to about 20 parts by mass, optionally in a range of from about 0.1 to about 15 parts by mass, or optionally in a range of from about 0.1 to about 10 parts by mass, relative to 100 parts by mass of the total amount of components (A) to (C).

In various embodiments, component (F) comprises, or is, an alkoxysilane represented by the general formula:

$$R^{41}{}_x Si(OR^{42})_{(4-x)}$$

In the formula, $R^{41}$ is a monovalent hydrocarbon group. Examples of such groups include, but are not limited to: alkyl groups such as a methyl group, an ethyl group, a propyl group, a butyl group, a pentyl group, a hexyl group, a heptyl group, an octyl group, a nonyl group, a decyl group, and an octadecyl group; cycloalkyl groups such as a cyclopentyl group and cyclohexyl group; alkenyl groups such as a vinyl group, an allyl group, a butenyl groups, a pentenyl groups, a hexenyl group, a heptenyl group, an octenyl group, a nonenyl group, a decenyl group, and an octadecenyl group; aryl groups such as a phenyl group, tolyl group, xylyl group, and naphthyl group; aralkyl groups such as a benzyl group, phenethyl group, and phenylpropyl group; and halogenated alkyl groups such as a 3-chloropropyl group and 3,3,3-trifluoropropyl group. In certain embodiments, $R^{41}$ is an alkyl group or alkenyl group.

In further embodiments, $R^{41}$ is a methyl group or vinyl group.

In the formula, $R^{42}$ is an alkyl group. Examples of such groups include the alkyl groups described above for $R^{41}$. In certain embodiments, $R^{42}$ is a methyl group or an ethyl group.

In the formula, "x" is an integer of from 0 to 2, or optionally is 1 or 2.

Examples of component (F) include, but are not limited to: dimethyldimethoxysilane, methyltrimethoxysilane, methylphenyldimethoxysilane, and dimethyldiethoxysilane. Component (F) may be one of these alkoxysilanes or a combination of two or more used as a mixture. In certain embodiments, component (F) comprises, or is, dimethyldimethoxysilane and/or methyltrimethoxysilane.

The content of component (F) is not limited provided that it is an amount that can impart sufficient shelf life of the resulting composition. In various embodiments, the content of component (F) is in a range of from about 0.5 to about 20 parts by mass, optionally in a range of from about 1 to about 20 parts by mass, optionally in a range of from about 1 to about 15 parts by mass, or optionally in a range of from about 0.5 to about 10 parts by mass, relative to 100 parts by mass of the total amount of components (A) to (C). It is thought that when the content of component (F) is greater than or equal to the lower limit of the range described above, the resulting composition cures rapidly by moisture in air, and when the content is less than or equal to the upper limit of the range described above, the curability of the resulting composition is sufficient and the shelf life of the resulting composition under moisture blocking is improved.

In various embodiments, the composition further comprises a fluorescent whitening agent. Examples of the fluorescent whitening agents include, but are not limited to: benzoxazole derivatives such as 2,5-thiophenediylbis(5-tert-butyl-1,3-benzoxazole), which are commercially available under the trade name Tinopal OB from BASF; diaminostilbene-sulphonic acid derivatives such as disodium salt of 4,4'-bis-(2-morpholino-4 anilino-s-triazin-6-ylamino) stilbene disulphonate, which are commercially available under the trade name Tinopal DMS from Ciba-Geigy AG; and bisphenyl-distyryl derivatives such as disodium salt of 2,2'-bis-(phenyl-styryl) disulphonate, which are commercially available under the trade name Tinopal CBS from Ciba-Geigy AG; and diarylpyrazoline derivatives.

The content of the fluorescent whitening agent is not limited provided that it is an amount that visibility of coating the resulting composition is improved under UV light exposure. In various embodiments, the content of the fluorescent whitening agent is in a range of from about 0.001 to about 0.1 parts by mass, optionally in a range of from about 0.005 to about 0.1 parts by mass, or optionally in a range of from about 0.005 to about 0.05 parts by mass, relative to 100 parts by mass of the total amount of components (A) to (C).

In various embodiments, the composition further comprises a corrosion inhibitor. Examples of the corrosion inhibitors include, but are not limited to; 1H-1,2,3-triazole, 2H-1,2,3-triazole, 1H-1,2,4-triazole, 4H-1,2,4-triazole, 2-(2'-hydroxy-5'-methylphenyl)benzotriazole, 1H-1,2,3-triazole, 2H-1,2,3-triazole, 1H-1,2,4-triazole, 4H-1,2,4-triazole, benzotriazole, tolyltriazole, carboxybenzotriazole, 1H-benzotriazole-5-methylcarboxylate, 3-amino-1,2,4-triazole, 4-amino-1,2,4-triazole, 5-amino-1,2,4-triazole, 3-mercapto-1,2,4-triazole, chlorobenzotriazole, nitrobenzotriazole, aminobenzotriazole, cyclohexano[1,2-d]triazole, 4,5,6,7-tetrahydroxytolyltriazole, 1-hydroxybenzotriazole, ethylbenzotriazole, naphthotriazole, 1-N,N-bis(2-ethylhexyl)-[(1,2,4-triazole-1-yl)methyl]amine, 1-[N,N-bis(2-ethylhexyl)aminomethyl]benzotriazole, 1-[N,N-bis(2-ethylhexyl)aminomethyl]tolyltriazole, 1-[N,N-bis(2-ethylhexyl)aminomethyl]carboxybenzotriazole, 1-[N,N-bis(2-hydroxyethyl)-aminomethyl]benzotriazole, 1-[N,N-bis(2-hydroxyethyl)-aminomethyl]tolyltriazole, 1-[N,N-bis(2-hydroxyethyl)-aminomethyl]carboxybenzotriazole, 1-[N,N-bis(2-hydroxypropyl)aminomethyl]carboxybenzotriazole, 1-[N,N-bis(1-butyl)aminomethyl]carboxybenzotriazole, 1-[N,N-bis(1-octyl)aminomethyl]carboxybenzotriazole, 1-(2',3'-di-hydroxypropyl)benzotriazole, 1-(2',3'-di-carboxyethyl)benzotriazole, 2-(2'-hydroxy-3',5'-di-tert-butylphenyl)benzotriazole, 2-(2'-hydroxy-3',5'-amylphenyl)benzotriazole, 2-(2'-hydroxy-4'-octoxyphenyl)benzotriazole, 2-(2'-hydroxy-5'-tert-butylphenyl)benzotriazole, 1-hydroxybenzotriazole-6-carboxylic acid, 1-oleoylbenzotriazole, 1,2,4-triazol-3-ol, 5-amino-3-mercapto-1,2,4-triazole, 5-amino-1,2,4-triazole-3-carboxylic acid, 1,2,4-triazole-3-carboxyamide, 4-aminourazole, and 1,2,4-triazol-5-one.

The content of the corrosion inhibitor is not limited provided that it is an amount that can suppress corrosion of substrates covered with a cured product of the resulting composition. In various embodiments, the content of the corrosion inhibitor is in a range of from about 0.01 ppm to about 3% of the composition in terms of mass units.

In various embodiments, the composition further comprises a chelating agent. Examples of the chelating agent include, but are not limited to: alpha-substituted aceto-acetic esters such as methylacetoacetate, ethylacetoacetate, or the like.

The content of the chelating agent is not limited provided that it is an amount that can impart sufficient stability of the resulting composition. In various embodiments, the content of the chelating agent is in a range of from about 0.01 to about 20 parts by mass, or optionally in a range of from about 0.01 to about 15 parts by mass, relative to 100 parts by mass of the total amount of components (A) to (C).

In various embodiments, the composition further comprises an adhesion promoter. Examples of the adhesion promoter include, but are not limited to: epoxy group-containing alkoxysilanes such as 3-glycidoxytrimethoxysilane, 3-glycidoxypropyltriethoxysilane, 3-glycidoxypropylmethoxysilane, 2-(3,4-epoxycyclohexyl)ethyltrimethoxysilane, and 4-oxysilanylbutyltrimethoxysilane; acrylic group-containing alkoxysilanes such as 3-methacryloxypropyltrimethoxysilane, 3-methacryloxypropyltriethoxysilane, and 3-acryloxypropyltrimethoxysilane; amino group-containing alkoxysilanes such as 3-aminopropyltrimethoxysilane, 3-aminopropyltriethoxysilane, N-(2-aminoethyl)-3-aminopropyltrimethoxysilane, and N-phenyl-3-aminopropyltrimethoxysilane; and reaction mixtures of the above epoxy group-containing alkoxysilanes and the above amino group-containing alkoxysilanes. In certain embodiments, the adhesion promoter comprises, or is, selected from reaction mixtures of the above epoxy group-containing alkoxysilanes and the above amino group-containing alkoxysilanes.

The content of the adhesion promoter is not limited provided that it is an amount that can impart sufficient adhesion to various substrates that the composition contacts during curing. In various embodiments, the content of the adhesion promoter is in a range of from about 0.01 to about 10 parts by mass, or optionally in a range of from about 0.01 to about 5 parts by mass, relative to 100 parts by mass of the total amount of components (A) to (C).

<Electric/Electronic Apparatus>

In various embodiments, the electric/electronic apparatus according to this disclosure is obtained by using the moisture curable polyorganosiloxane composition described above. The electric/electronic apparatus is not particularly limited, but is exemplified by electric/electronic apparatuses that contain electrical circuits, electrodes, or the like. It is thought that such electric/electronic apparatuses have good to excellent reliability due to good to excellent adhesion to the substrate contacted during curing of the cured product, and/or good to excellent thermal shock stability.

EXAMPLES

The following examples, illustrating the moisture curable polyorganosiloxane composition and the cured product, are intended to illustrate and not limit the present invention. Note that in Practical and Comparative Examples, tack-free time of the composition, and mechanical properties and adhesive properties of the cured product obtained by curing the composition were evaluated as follows.

<Coating Method>

Coatings were prepared by draw down method using a Zehntner auto coater (ZAA2300) with vacuum board and 10 cm wide Zehntner adjustable coating bar (ZUA2000).

The following substrates were coated for the specified test method:

Stress/Strain testing: 3M 9956 PET Fluoropolymer Release Liner

Adhesion/Abrasion testing: (3" wide×3" long×1/32" thick) Garolite G-10 fiberglass/epoxy board.

Mandrel bend test: A-36 aluminum Q-Panel

The bar was adjusted to target a final dried/cured coating thickness of 100 μm for all formulations and substrates. All coating was conducted at 25 mm/sec at RT. Following coating, samples were allowed to dry at RT for ½ hour before being placed in humidity/temp controlled room at 22° C./50% RH for 3 days.

<Tack-Free Time>

Formulations were manually coated onto A-36 aluminum Q-Panels using a 10 mil square-5 cm wide draw down bar targeting a final coating thickness of 100 μm. Immediately after coating, the coating surface was tested for tack every 30 seconds until tack free time was achieved. This time was recorded and testing completed. A hand was snuggly fitted with a nitrile glove and one finger (clean/dry) was pressed gently against coating surface and released immediately. If any adhesion was observed upon release, then testing continued until no tack was observed.

<Stress/Strain Testing>

Stress/stress testing was completed using a TA RSA G2 Solids Analyzer equipped with film tension clamp. Samples were punched out using ASTM D1708 die. Dog bone samples are 22 mm long and 5 mm wide between tabs. Samples were removed from release liner after being punched out but prior to testing. Dog bones were then secured to top and bottom brackets of TA tension clamps, making sure tension across sample width is evenly distributed (no buckles). A 10 g pretension was applied prior to starting the test. Samples were pulled at 100 mm/min (all at RT). Testing was completed after break was observed. 3 samples for each condition were used to compile data (some samples displayed a pre-mature failure, in which case they were repeated). TA Trios was used for data analysis and the following results were reported as the average of 3 samples.

Stress at Yield (MPa)
Strain at Yield (%)
Stress at Break (MPa)
Strain at Break (%)
Young's Modulus (MPa) calculated between 0% and 2%

Samples that were brittle would fracture during die punch, therefore testing was not completed. These samples were labeled "brittle". Note: Final cured coating color, clarity, and surface appearance was observed and documented prior to testing.

<Adhesion/Abrasion Testing>

Following 3 days at 22° C./50% RH, the coated G-10 boards were allowed to rest at RT for at least 1 hour prior to testing. Coating appearance on board was observed and documented. A Precision Gage & Tool adhesion test kit was used for testing. The kit included an adhesion cutting tool equipped with an 11 tooth/1.5 mm gap blade and a stiff bristled nylon brush (2×7 cm). The cutting tool was used to score the surface of the sample using firm and even pressure. The cutting edge angle was between 15 and 30 degrees. Two cuts were made for each sample perpendicular to each other creating a grid in the center of the sample consisting of 100 squares. The nylon brush was then used to rub the sample surface. 20 strokes (back and forth for each stroke) were performed diagonally across the scored grid using moderate force and speed. Tape was then adhered diagonally across scored grid with moderate force and then immediately removed. The grid was then carefully examined and adhesion was reported as follows:

<Adhesion Rating>

Samples were ranked from 0 to 5 based on the amount of coating that has flaked from the substrate in the grid. "5" is the highest rating and shows no flaking of the coating. "0" is the lowest rating and shows that greater than 65% of the coating has flaked from the substrate.

<#Removed Sections>

This data was collected by counting the number of sections in the grid that lost the coating during testing. There are 100 sections for each sample.

<Abrasion Rating>

Abrasion was recorded as a comparative observation and ranked from 0 to 5 based on the amount of surface damage (scratching) endured by the coating from the brush. "5" is the highest rating and demonstrates no surface damage. "0" is the lowest rating and demonstrates complete surface damage.

<Mandrel Bend Testing>

Following 3 days at 22° C./50% RH, the coated A-36 panels were allowed to rest at RT for at least 1 hour prior to testing. The Mandrel Bend Test was performed by using a Gardner Laboratory Mandrel Set (MG 1412). The ⅛" diameter test bar was selected and placed in the bar holder on the top of the test set. For each sample, the A-36 panel was placed perpendicular and centered across the bar with the coated side facing up. With even pressure on each end of the panel, the panel was bent downward, wrapping the panel around the test bar (leaving an inside bend angle of ~40°). The coated surface at and around the bend was observed for cracks, peeling, and defects. The value was recorded as either "Pass" or "Fail." "Pass" would demonstrate no defects, "Fail" would demonstrate any type of defects regardless of its severity. Testing was performed both initially and again at 7 days (stored at RT).

Reference Example 1: Preparation of Methyl-T Resin

A 500 mL 4-neck round bottom flask was loaded with methylltrimethoxysilane (350.0 g, 2.569 moles). The catalyst trifluoromethanesulfonic acid (0.175 g) was added next followed by DI water (52.08 g, 2.891 moles) which was added slowly starting at room temperature. After addition was complete the reaction was heated at reflux for 3 hours. Afterwards it was cooled to 50° C. at which point calcium carbonate (0.70 g) was added to neutralize the trifluoromethanesulfonic acid. It was mixed overnight at room temperature. The next day a Dean Stark apparatus was inserted and methanol distilled of up to a pot temperature of 115° C. Reaction was held at 115° C. for 1 hour. Material was transferred into a 1 neck rotovap flask and stripped on a rotovapor at an oil bath temperature of 110° C. and ~1-2 mmHg. It was cooled to room temperature and then pressure filtered through a 47 mm diameter Magna, Nylon, Supported, Plain, 0.45 Micron filter. Product was a clear, low viscosity liquid at room temperature. Isolated Yield: 194.9 g; Product composition from NMR analysis: $[(CH_3)_2SiO_{2/2}]_{0.14}[CH_3SiO_{3/2}]_{0.986}$; a content of OZ=73.46 mol % (68.45 mol % of $OCH_3$, 5.01 mol % of OH); Mw=2455 g/mol.

Reference Example 2: Preparation of Vinyl Functional Methyl-T Resin

A 500 mL 4-neck round bottom flask was loaded with methylltrimethoxysilane (350.0 g, 2.569 moles) and vinyl dimer (12.5 g, 0.134 moles Si). The catalyst trifluoromethanesulfonic acid (0.181 g) was added next followed by DI water (51.17 g, 2.84 moles) which was added slowly starting at room temperature. After addition was complete the reaction was heated at reflux for 3 hours. Afterwards it was cooled to 50° C. at which point calcium carbonate (0.72 g) was added to neutralize the trifluoromethanesulfonic acid. It was mixed for 2 hours while cooling to room temperature. A Dean Stark apparatus was inserted and methanol distilled of up to a pot temperature of 115° C. Reaction was held at 115° C. for 1 hour. Material was transferred into a 1 neck rotovap flask and stripped on a rotovapor at an oil bath temperature of 110° C. and ~1-2 mmHg. It was cooled to room temperature and then pressure filtered through a 47 mm diameter Magna, Nylon, Supported, Plain, 0.45 Micron filter. Product was a clear, low viscosity liquid at room temperature. Isolated Yield: 206.4 μg; Product composition from NMR analysis: $[(CH_2=CH)(CH_3)_2SiO_{2/2}]_{0.39}[(CH_3)_2SiO_{2/2}]_{0.12}[CH_3SiO_{3/2}]_{0.949}$; a content of OZ=73.56 mole % (69.40 mol % of $OCH_3$, 4.16 mol % of OH); Mw=1773 g/mol.

Practical Examples 1 to 17 and Comparative Examples 1 to 5

The following components were mixed in the compositions (part by mass) shown in Table 1 to prepare moisture curable polyorganosiloxane compositions. These tack-free times, mechanical properties and adhesive properties were evaluated. These results are shown in Table 1.

The following components were used as component (A).

Component (a-1): a polydimethylsiloxane represented by the following formula:

$$X\text{—}[(CH_3)_2SiO]_{180}Si(CH_3)_2\text{—}X$$

wherein X=—$C_2H_4$—$Si(CH_3)_2OSi(CH_3)_2$—$C_2H_4$—$Si(OCH_3)_3$

Component (a-2): a polydimethylsiloxane represented by the following formula:

$$X\text{—}[(CH_3)_2SiO]_{124}Si(CH_3)_2\text{—}X$$

wherein X=—$C_2H_4$—$Si(CH_3)_2OSi(CH_3)_2$—$C_2H_4$—$Si(OCH_3)_3$

The following components were used as component (B).

Component (b-1): a polyorganosiloxane represented by the average unit formula:

$[(CH_3)_2SiO_{2/2}]_{0.013}[CH_3SiO_{3/2}]_{0.987}$; a content of OZ=109.7 mol % (108.3 mol % of $OCH_3$, 1.4 mol % of OH); Mw=1300 g/mol.

Component (b-2): a polyorganosiloxane resin prepared by Reference Example 1.

Component (b-3): a polyorganosiloxane resin prepared by Reference Example 2.

The following components were used as component (C).

Component (c-1): a polyorganosiloxane represented by the average unit formula:

$[(CH_3)_3SiO_{1/2}]_{0.34}[X(CH_3)_2SiO_{1/2}]_{0.11}[SiO_{4/2}]_{0.55}$ wherein X=—$C_2H_4$—$Si(CH_3)_2OSi(CH_3)_2$—$C_2H_4$—$Si(OCH_3)_3$ The following components were used as component (D).

Component (d-1): titanium ethyl acetoacetate complex

The following components were used as component (E).

Component (e-1): octane

The following components were used as component (F).

Component (f-1): methyl trimethoxysilane

The following was procedures outline formulation preparation:

15 g of blended components (A) to (C) was weighed into 20 ml borosilicate vial. Additional component (C) was added if desired (vortex mixed until evenly dispersed). Each of components (D) to (F) was then added. Vial was $N_2$ purged, sealed, and vortex mixed until evenly dispersed. Samples were then mixed at 10-15 rpm on rotary sample mixer for 1-2 hours: 1 hour for lower viscosity (<1000 cP) and 2 hours for higher viscosity (>1000 cP). Samples were allowed to rest at RT for 1-2 hours for de-airing. Formulations were prepared and coated within 10 hours.

TABLE 1

| Item | | | Category Practical Examples | | | | | | |
|---|---|---|---|---|---|---|---|---|---|
| | | | 1 | 2 | 3 | 4 | 5 | 6 | 7 |
| Moisture curable | (A) | (a-1) | 28.0 | 28.0 | 28.0 | 28.0 | 28.0 | 28.0 | 28.0 |
| organopolysiloxane | (B) | (b-1) | 12.0 | 12.0 | 12.0 | 12.0 | 12.0 | 12.0 | 12.0 |
| composition | (C) | (c-1) | 60.0 | 60.0 | 60.0 | 60.0 | 60.0 | 60.0 | 60.0 |
| (parts by mass) | (D) | (d-1) | 4.0 | 2.0 | 1.0 | 0.5 | 4.0 | 4.0 | 4.0 |
| | (E) | (e-1) | 5.0 | 5.0 | 5.0 | 5.0 | 5.0 | 5.0 | 5.0 |
| | (F) | (f-1) | — | — | — | — | 2.5 | 5.0 | 10.0 |
| Stress at Yield (MPa) | | | 4.3 | 3.8 | 3.2 | 2.6 | 3.9 | 3.8 | 3.8 |
| Strain at Yield (%) | | | 2.88 | 2.95 | 2.83 | 2.71 | 2.90 | 2.82 | 2.88 |
| Stress at Break (MPa) | | | 8.1 | 7.0 | 5.6 | 4.4 | 7.4 | 7.3 | 7.4 |
| Strain at Break (%) | | | 206 | 206 | 206 | 224 | 208 | 208 | 213 |
| Young's Modulus (MPa) | | | 131.5 | 132.1 | 134.1 | 126.8 | 135.0 | 141.7 | 147.7 |
| Tack-free time (min.) | | | 4 | 5 | 6.5 | 9 | 4.5 | 5 | 5 |
| Adhesion Rating | | | 5 | 5 | 5 | 5 | 5 | 5 | 5 |
| # Removed Section | | | 0 | 0 | 0 | 0 | 0 | 0 | 0 |
| Abrasion Rating | | | 3 | 3 | 3 | 2 | 2 | 2 | 2 |
| Mandrel Bend | | Initial | Pass | Pass | Pass | Pass | Pass | Pass | Pass |
| | | 7 day | Pass | Pass | Pass | Pass | Pass | Pass | Pass |

TABLE 1-continued

|  |  |  | Category Practical Examples | | | |
|---|---|---|---|---|---|---|
| Item | | | 8 | 9 | 10 | 11 |
| Moisture curable organopolysiloxane composition (parts by mass) | (A) | (a-1) | 32.0 | 24.0 | 20.0 | 20.0 |
| | (B) | (b-1) | 8.0 | 16.0 | 20.0 | 20.0 |
| | (C) | (c-1) | 60.0 | 60.0 | 60.0 | 60.0 |
| | (D) | (d-1) | 4.0 | 4.0 | 4.0 | 4.0 |
| | (E) | (e-1) | 5.0 | 5.0 | 5.0 | — |
| | (F) | (f-1) | — | — | — | 5.0 |
| Stress at Yield (MPa) | | | 3.0 | 6.2 | 8.9 | 9.4 |
| Strain at Yield (%) | | | 3.15 | 2.83 | 2.69 | 3.12 |
| Stress at Break (MPa) | | | 8.2 | 7.9 | 7.3 | 7.1 |
| Strain at Break (%) | | | 236 | 174 | 113 | 66 |
| Young's Modulus (MPa) | | | 122.5 | 152.7 | 155.7 | 142.2 |
| Tack-free time (min.) | | | 5 | 3.5 | 3.5 | 4 |
| Adhesion Rating | | | 5 | 5 | 5 | 5 |
| # Removed Section | | | 0 | 0 | 0 | 0 |
| Abrasion Rating | | | 3 | 3 | 3 | 3.5 |
| Mandrel Bend | Initial | | Pass | Pass | Pass | Pass |
| | 7 day | | Pass | Pass | Pass | Pass |

|  |  |  | Category Practical Examples | | | | | |
|---|---|---|---|---|---|---|---|---|
| Item | | | 12 | 13 | 14 | 15 | 16 | 17 |
| Moisture curable organopolysiloxane composition (parts by mass) | (A) | (a-1) | 25.0 | 25.0 | — | — | 25.0 | — |
| | | (a-2) | — | — | 30.0 | 20.0 | — | 25.0 |
| | (B) | (b-1) | 25.0 | — | — | — | — | — |
| | | (b-2) | — | 25.0 | 20.0 | 20.0 | — | — |
| | | (b-3) | — | — | — | — | 25.0 | 25.0 |
| | (C) | (c-1) | 50.0 | 50.0 | 50.0 | 60.0 | 50.0 | 50.0 |
| | (D) | (d-1) | 4.0 | 4.0 | 4.0 | 4.0 | 4.0 | 4.0 |
| | (E) | (e-1) | 10.0 | 10.0 | 10.0 | 10.0 | 10.0 | 10.0 |
| Stress at Yield (MPa) | | | 3.2 | 3.0 | 3.6 | 8.6 | 3.4 | 4.0 |
| Strain at Yield (%) | | | 2.55 | 2.44 | 2.72 | 3.13 | 2.44 | 2.64 |
| Stress at Break (MPa) | | | 6.9 | 7.0 | 6.2 | 6.9 | 7.9 | 8.4 |
| Strain at Break (%) | | | 151 | 175 | 100 | 77 | 165 | 135 |
| Young's Modulus (MPa) | | | 131.6 | 128.4 | 136.1 | 153.3 | 134.0 | 132.4 |
| Adhesion Rating | | | 5 | 5 | 5 | 5 | 5 | 5 |
| # Removed Section | | | 0 | 0 | 0 | 0 | 0 | 0 |
| Abrasion Rating | | | 2 | 2 | 2 | 2 | 2 | 2 |

|  |  |  | Category Comparative Examples | | | | |
|---|---|---|---|---|---|---|---|
| Item | | | 1 | 2 | 3 | 4 | 5 |
| Moisture curable organopolysiloxane composition (parts by mass) | (A) | (a-1) | 40.0 | 70.0 | 60.0 | 50.0 | 16.0 |
| | (B) | (b-1) | — | 30.0 | 40.0 | 50.0 | 24.0 |
| | (C) | (c-1) | 60.0 | — | — | — | 60.0 |
| | (D) | (d-1) | 4.0 | 4.0 | 4.0 | 4.0 | 4.0 |
| | (E) | (e-1) | 10.0 | — | — | — | 5.0 |
| Stress at Yield (MPa) | | | 0.8 | No Yield | No Yield | No Yield | Brittle |
| Strain at Yield (%) | | | 3.93 | No Yield | No Yield | No Yield | Brittle |
| Stress at Break (MPa) | | | 7.3 | 1.4 | 0.9 | 0.9 | Brittle |
| Strain at Break (%) | | | 299 | 25 | 20 | 17 | Brittle |
| Young's Modulus (MPa) | | | 37.2 | 8.1 | 5.8 | 7.2 | Brittle |
| Tack-free time (min.) | | | 6 | 21 | 33 | 42 | 3.5 |
| Adhesion Rating | | | 5 | 0 | 0 | 0 | 5 |
| # Removed Section | | | 0 | 100 | 100 | 100 | 0 |
| Abrasion Rating | | | 1 | 5 | 5 | 5 | 3 |
| Mandrel Bend | Initial | | Pass | Pass | Pass | Fail | Fail |
| | 7 day | | Pass | Not measured | Not measured | Not measured | Fail |

According to Practical Examples and Comparative Examples, it was clearly shown the benefit of the present invention. That is, Comparative Example 1 didn't utilize the polyorganosiloxane resin for component (B), resulting in a very low modulus and poor abrasion resistance. Comparative Examples 2, 3 and 4 omit the polyorganosiloxane resin for component (C), so that the absence of a yield point in the stress-strain curve indicates low mechanical toughness as compared to Practical Examples 1 through 17. In addition these Comparative Examples exhibit low Modulus and poor adhesion. Comparative Example 5 shows that there is a limit to how much components (B) and (C) can be added before the moisture cured films become too brittle. This will set the upper mass % limits for these two components. Practical Examples vary the polyorganosiloxane resins for component (B) molecular weight, structure and amount in the formulations in addition to degree of polymerization of the polyorganosiloxane for component (A) and component (C) levels. All formulations have acceptable tack-free times, mechanical toughness, adhesion resistance, abrasion resistance and flexibility.

INDUSTRIAL APPLICABILITY

The moisture curable polyorganosiloxane composition of this disclosure is advantageously used as a conformal coating of an electric/electronic apparatus, because it cures at room temperature by contact with moisture in air and forms a cured product that exhibits good to excellent adhesion to the substrate contacted during curing, and good to excellent mechanical properties such as a breaking stress and/or elongation.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims.

The subject matter of all combinations of independent and dependent claims, both single and multiple dependent, is herein expressly contemplated.

What is claimed is:

1. A moisture curable polyorganosiloxane composition comprising:

(A) about 17 to about 40 mass %, based on the combined mass of components (A) to (C), of a polyorganosiloxane represented by the following general formula:

$$X-(SiR^{11}_2O)_m-SiR^{11}_2-X$$

wherein each $R^{11}$ is the same or different monovalent hydrocarbon group lacking an aliphatic unsaturated bond, each X is an alkoxysilyl-containing group, and "m" is an integer of from 20 to 1000;

(B) about 5 to about 30 mass %, based on the combined mass of components (A) to (C), of a polyorganosiloxane resin having a content of OZ in a range of from about 50 mol % to about 150 mol %, wherein each Z is H or an alkyl group such that OZ represents a silanol group and/or a silicon atom-bonded alkoxy group, and represented by the following average unit formula:

$$(R^{21}_3SiO_{1/2})_c(R^{21}_2SiO_{2/2})_d(R^{21}SiO_{3/2})_e(SiO_{4/2})_f$$

wherein each $R^{21}$ is the same or different monovalent hydrocarbon group, and "c", "d", "e" and "f" are numbers satisfied by the following conditions: $0 \le c < 0.2$, $0 \le d \le 0.5$, $0.4 < e \le 1.0$, $0 \le f < 0.2$, and $c+d+e+f=1$; and (C) about 40 to about 70 mass %, based on the combined mass of components (A) to (C), of a polyorganosiloxane resin represented by the following average unit formula:

$$(R^{31}_3SiO_{1/2})_g(SiO_{4/2})_1$$

wherein each $R^{31}$ is the same or different, and selected from a monovalent hydrocarbon group or X as described above, provided however, at least one $R^{31}$ is X per molecule, and "g" is a number of about 0.5 to about 1.5.

2. The moisture curable polyorganosiloxane composition according to claim 1, wherein X in component (A) is an alkoxysilyl-containing group selected from the group consisting of:

a group represented by the following general formula;

$$-R^{13}-SiR^{11}_a(OR^{12})_{(3-a)},$$

a group represented by the following general formula;

$$-R^{13}-(SiR^{11}_2O)_n-SiR^{11}_2-R^{13}-SiR^{11}_a(OR^{12})_{(3-a)},$$

and a group represented by the following general formula;

$$-R^{13}-(SiR^{11}_2O)_n-SiR^{11}_b-[OSiR^{11}_2-R^{13}-SiR^{11}_a(OR^{12})_{(3-a)}]_{(3-b)},$$

wherein each $R^{11}$ is the same or different monovalent hydrocarbon group lacking an aliphatic unsaturated bond, each $R^{12}$ is an alkyl group, each $R^{13}$ is the same or different alkylene group, "a" is 0, 1 or 2, and "b" is 0 or 1.

3. The moisture curable polyorganosiloxane composition according to claim 1, wherein X in component (A) is a group represented by the following formula:

$$-C_2H_4-Si(CH_3)_2O-Si(CH_3)_2-C_2H_4-Si(OCH_3)_3.$$

4. The moisture curable polyorganosiloxane composition according to claim 1, wherein component (B) is a polyorganosiloxane resin represented by the following average unit formula:

$$(R^{21}_2SiO_{2/2})_d(R^{21}SiO_{3/2})_e$$

wherein each $R^{21}$ is the same or different monovalent hydrocarbon group, and "d" and "e" are numbers satisfied by the following conditions: $0 < d \le 0.5$, $0.5 \le e < 1.0$, and $d+e=1$.

5. The moisture curable polyorganosiloxane composition according to claim 1, wherein X in component (C) is an alkoxysilyl-containing group selected from the group consisting of:

a group represented by the following general formula;

$$-R^{13}-SiR^{11}_a(OR^{12})_{(3-a)},$$

a group represented by the following general formula;

$$-R^{13}-(SiR^{11}_2O)_n-SiR^{11}_2-R^{13}-SiR^{11}_a(OR^{12})_{(3-a)},$$

and a group represented by the following general formula;

$$-R^{13}-(SiR^{11}_2O)_n-SiR^{11}_b-[OSiR^{11}_2-R^{13}-SiR^{11}_a(OR^{12})_{(3-a)}]_{(3-b)},$$

wherein each $R^{11}$ is the same or different monovalent hydrocarbon group lacking an aliphatic unsaturated bond, each $R^{12}$ is an alkyl group, each $R^{13}$ is the same or different alkylene group, "a" is 0, 1 or 2, and "b" is 0 or 1.

6. The moisture curable polyorganosiloxane composition according to claim 1, wherein X in component (C) is a group represented by the following formula:

$$-C_2H_4-Si(CH_3)_2O-Si(CH_3)_2-C_2H_4-Si(OCH_3)_3.$$

7. The moisture curable polyorganosiloxane composition according to claim 1, further comprising (D) a condensation-reaction catalyst, in an amount of about 0.01 to about 20 parts by mass per 100 parts by mass of the total amount of components (A) to (C).

8. The moisture curable polyorganosiloxane composition according to claim 7, further comprising (E) an arbitrary amount of a solvent.

9. The moisture curable polyorganosiloxane composition according to claim 8, further comprising (F) an alkoxysilane represented by the general formula:

$$R^{41}_xSi(OR^{42})_{(4-x)}$$

wherein $R^{41}$ is a monovalent hydrocarbon group, $R^{42}$ is an alkyl group, and "x" is an integer of from 0 to 2, in an amount of about 0.1 to about 20 parts by mass per 100 parts by mass of the total amount of components (A) to (C).

10. The moisture curable polyorganosiloxane composition according to claim 7, further comprising (F) an alkoxysilane represented by the general formula:

$$R^{41}_x Si(OR^{42})_{(4-x)}$$

wherein $R^{41}$ is a monovalent hydrocarbon group, $R^{42}$ is an alkyl group, and "x" is an integer of from 0 to 2, in an amount of about 0.1 to about 20 parts by mass per 100 parts by mass of the total amount of components (A) to (C).

11. The moisture curable polyorganosiloxane composition according to claim 1, further comprising (E) an arbitrary amount of a solvent.

12. The moisture curable polyorganosiloxane composition according to claim 1, further comprising (F) an alkoxysilane represented by the general formula:

$$R^{41}_x Si(OR^{42})_{(4-x)}$$

wherein $R^{41}$ is a monovalent hydrocarbon group, $R^{42}$ is an alkyl group, and "x" is an integer of from 0 to 2, in an amount of about 0.1 to about 20 parts by mass per 100 parts by mass of the total amount of components (A) to (C).

13. A conformal coating agent comprising the moisture curable polyorganosiloxane composition according to claim 1.

14. An electric/electronic apparatus obtained by using the moisture curable polyorganosiloxane composition according to claim 1.

15. A cured product formed from the moisture curable polyorganosiloxane composition according to claim 1.

* * * * *